March 7, 1933.  E. M. POIROT  1,900,614
METHOD OF PREPARING ARTIFICIAL MANURES
Filed Oct. 25, 1929
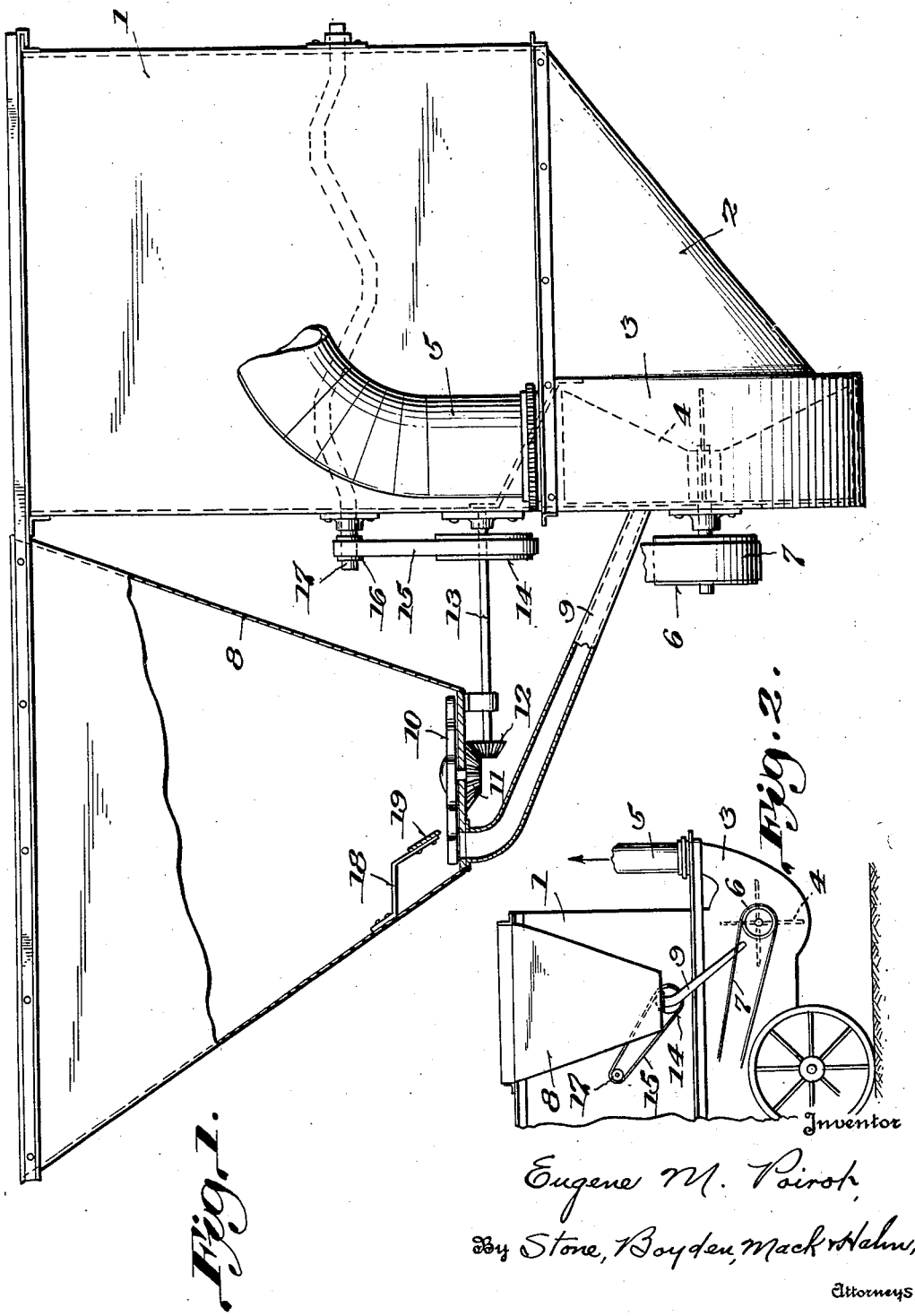

Patented Mar. 7, 1933

1,900,614

UNITED STATES PATENT OFFICE

EUGENE M. POIROT, OF POIROT FARMS, MISSOURI, ASSIGNOR TO ARTHUR CAPPER, TRUSTEE, OF KANSAS

METHOD OF PREPARING ARTIFICIAL MANURES

Application filed October 25, 1929. Serial No. 402,530.

This invention relates to the art of preparing artificial manures from waste organic materials such as straw, leaves, etc.

It has heretofore been proposed to cause decomposition of such material by mixing therewith certain chemical reagents which tend to promote bacterial action. In prior methods it has been customary to build up a pile or compost heap by spreading a layer of organic material, sprinkling upon this the chemical reagent in powdered form, thoroughly wetting such layer, and then repeating the process. This method is troublesome and tedious, and moreover the chemical reagents are not uniformly distributed throughout the organic material and are likely to be washed off by the applied water.

I have discovered that the chemical reagents can be much more intimately and thoroughly mixed with the organic material such as straw by applying the same directly to the stream of straw as it comes from a threshing machine. More specifically, I have found that the best results are obtained by the use of a pneumatic stacker and by feeding the powdered chemical reagents into the fan housing of such stacker.

I have further discovered that depositing the mixture of straw and chemicals in an open pile, in a loose tangled mass, and permitting such pile to be acted on by ordinary rainfall, is much superior to wetting of the straw artificially during the building up of the pile.

In order that the invention and one means for carrying it out may be readily understood, reference is had to the accompanying drawing, forming part of this specification and in which:

Figure 1 is a rear elevation of a portion of a threshing machine and pneumatic stacker, parts being shown in section and parts being broken away; and Figure 2 is a fragmentary side elevation on a smaller scale of the same parts, but looking in a direction at right angles to that of Figure 1.

I do not confine myself to the use of any particular chemical reagents, but I have found in practice that excellent results can be obtained by using a mixture of ammonium sulphate 45 per cent, finely ground limestone 40 per cent, and acid phosphate 15 per cent. The exact proportions of these ingredients may be varied to some extent and also other materials may or may not be added. I have further found that these chemicals are very effective in promoting bacterial action and decomposition when applied in the proportion of 150 pounds of chemicals to the ton of air dry straw.

Referring to the drawing in detail, 1 designates a portion of a threshing machine of the usual type equipped with a pneumatic stacker comprising a feed chute 2, a fan housing 3, a fan 4, and a discharge pipe 5. The fan is driven by means of a belt 7 passing over a pulley 6 secured to the fan shaft.

In carrying out my improved method of mixing the chemical reagents with the straw, I provide a hopper 8 which may be conveniently secured to and supported by the threshing machine, this hopper being positioned at a point above the level of the fan housing of the stacker. From the bottom of the hopper extends a delivery pipe 9 in a downwardly inclined direction to the side of the fan housing.

The hopper preferably has inclined walls, as shown, and is provided at its bottom with a rotary distributing or feeding device, shown as a toothed disk 10. The special form of this disk constitutes no part of my invention, and it may be of any desired or suitable construction. I have found in practice that a feeding device of the type employed in fertilizer distributors is eminently satisfactory. A guard plate 18, having at its edge an adjustable cutoff 19, is preferably employed in connection with the rotary disk 10, as is the usual practice in fertilizer distributors.

The disk 10 is rotated by means of a beveled gear 11 disposed underneath the bottom of the hopper and meshing with a beveled pinion 12 carried by a horizontal shaft 13 on which is also mounted a pulley 14. This pulley is driven by means of a belt 15 from a pulley 16 on one of the shafts of the thresher, shown in the drawing as the straw rack shaft 17.

In operation the above described or other suitable chemical reagents in powdered form are placed in the hopper 8, and, during the running of the thresher, are fed at a uniform rate by the dispensing device 10 through the pipe 9 into the fan housing 3. The straw from the thresher is of course also drawn into and through this fan housing and thus becomes intimately mixed and impregnated with the powdered chemicals.

The straw, thus mixed with chemical reagents, is blown out through the discharge pipe 5 in the usual way, and delivered at the free end of such pipe into a stack or pile.

In the stacking of straw by means of a pneumatic stacker of the usual type, it is the common practice to deliver the straw onto the center of the pile or stack and thus build up the stack in such a way that the center is always higher than the edges. This results in the straw being deposited in layers which droop or slope from the center downwardly toward the edges of the stack. As is well known, a stack erected in this way sheds water quite well, and the inner portions of such a stack frequently remain dry even after prolonged exposure to the weather.

For the purpose of inducing decomposition, and conversion of the straw into manure, however, it is desirable that the stack or pile should be so constructed that it will not shed water, but that the rain falling thereon will be absorbed and will permeate into and completely through the pile. One way of producing this result is to deliver the straw in such a manner as to build up the pile around the edges, leaving it with a flat or even hollow top, which will catch and hold the rain. In addition, I find that by changing the angle of the delivery end of the discharge spout and driving the straw into the sides of the pile, rather than depositing it on top, it is possible to cause the straw to accumulate in an interwoven, tangled mass in which the majority of individual straws do not droop or slope downwardly and outwardly, so as to form a water shed, but on the contrary are so arranged that water falling on the pile readily permeates through and soaks the same. In carrying out this method, a preliminary wall or ridge of straw is first built up by delivering the straw in the usual manner from above, and then the discharge pipe is shifted to a substantially horizontal position, and the straw delivered against the side of such wall, as above mentioned. Subsequently, the preliminary wall of straw can be opened up with a pitch fork, so as to cause it to absorb water.

Thus a pile of treated straw made in this manner and left in the open so as to be subject to rainfall, soon becomes wet through and through, with the result that decomposition and bacterial action, fostered by the chemical reagents present, take place rapidly, and the whole mass is quickly converted into manure.

In locations or seasons which are exceptionally dry it may sometimes be desirable to wet the pile artificially as by spraying or sprinkling with a hose or the like, but in any event, better results are obtained by piling the dry straw in a tangled mass in the manner described, and then applying water after the pile is complete, rather than by wetting the straw progressively during the piling operation as carried out in the usual way.

A part of the foregoing, including a discussion of the chemicals employed, is contained in Bulletin No. 258, of the Agricultural Experiment Station of the University of Missouri, issued November, 1927.

The specific apparatus illustrated in the drawing is claimed in my copending application Serial 493,424, filed November 4, 1930, comprising a division of this application.

What I claim is:

1. In a method of preparing artificial manure from straw at the time of threshing, which comprises conveying the straw from the thresher by means of a pneumatic stacker, feeding into the stream of straw passing in an air current through such stacker a chemical reagent tending to promote bacterial development, and depositing the mixture in a pile.

2. In a method of preparing artificial manure from straw at the time of threshing, which comprises conveying the straw from the thresher by means of a pneumatic stacker having a fan housing, and feeding into said fan housing at a uniform rate a dry powdered chemical reagent thus applying the reagent to the straw while suspended in the air current formed by the fan.

3. In a method of preparing artificial manure from straw at the time of threshing, which comprises conveying the straw from the thresher by means of a pneumatic stacker having a discharge pipe, feeding into the stream of straw passing through such stacker a chemical reagent tending to promote bacterial development, delivering the mixed straw and chemical from said pipe in an open pile, and so directing the end of the pipe that the treated straw is delivered onto the pile in an interwoven tangled mass permeable to rainfall, as distinguished from flat sloping layers.

4. In a method of preparing artificial manure from straw at the time of threshing, which comprises conveying the straw from the thresher by means of a pneumatic stacker having a discharge pipe, feeding into the stream of straw passing through such stacker a chemical reagent tending to promote bacterial development, delivering the mixed straw and chemical from said pipe in an open pile, and so directing the end of the pipe that the treated straw is driven into the sides of the pile, thereby producing an interwoven tangled mass which is exceptionally permeable to rainfall.

5. In a method of preparing artificial manure from vegetable refuse which comprises mixing by the action of air currents vegetable refuse with a chemical agent tending to promote bacterial action, delivering the mixture while in an entangled state to a pile, and pneumatically driving the mixture into the sides of the pile to arrange it in a form which renders it readily permeable by water.

6. In a method of preparing artificial manure from straw, which comprises passing straw in a stream to a pile by means of an air blast; supplying into the stream a powdered chemical reagent which is adapted to promote bacterial action, thus applying to the surface of the pieces of straw a coating of the chemical thus providing a propitious condition so that the bacteria on the straw becomes immediately active upon the application of moisture; and depositing the treated straw on the pile in a form which renders its readily permeable to moisture.

In testimony whereof I affix my signature.

EUGENE M. POIROT.